US009891943B2

United States Patent
Brenneman et al.

(10) Patent No.: US 9,891,943 B2
(45) Date of Patent: *Feb. 13, 2018

(54) PERFORMING VIRTUAL MACHINE LIVE MIGRATION WITHIN A THRESHOLD TIME BY ADDING AVAILABLE NETWORK PATH IN MULTIPATH NETWORK

(71) Applicant: International Business Machines Corporation, Armonk, NY (US)

(72) Inventors: Robert J. Brenneman, Stormville, NY (US); Eli M. Dow, Wappingers Falls, NY (US); Thomas D. Fitzsimmons, Poughkeepsie, NY (US); Jessie Yu, Wappingers Falls, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 133 days.

This patent is subject to a terminal disclaimer.

(21) Appl. No.: 15/071,330

(22) Filed: Mar. 16, 2016

(65) Prior Publication Data
US 2017/0147380 A1    May 25, 2017

Related U.S. Application Data

(63) Continuation of application No. 14/945,644, filed on Nov. 19, 2015, now Pat. No. 9,336,042.

(51) Int. Cl.
*G06F 9/455* (2006.01)

(52) U.S. Cl.
CPC .. *G06F 9/45558* (2013.01); *G06F 2009/4557* (2013.01); *G06F 2009/45595* (2013.01)

(58) Field of Classification Search
CPC ... G06F 2009/4557; G06F 2009/45595; G06F 9/45558
See application file for complete search history.

(56) References Cited

U.S. PATENT DOCUMENTS

2011/0145380 A1* 6/2011 Glikson ............ G06F 9/4856
                                                              709/223

OTHER PUBLICATIONS

List of IBM Patents or Patent Applictions Treated as Related; (Appendix P), Filed Mar. 16, 2016, 2 pages.

(Continued)

*Primary Examiner* — Benjamin Wu
*Assistant Examiner* — Jorge A Chu Joy-Davila
(74) *Attorney, Agent, or Firm* — Cantor Colburn LLP; Steven Chiu

(57) ABSTRACT

An estimated time to migrate a VM from a source hypervisor to a target hypervisor is calculated. The estimated time is compared to a threshold time and based on the estimated time meeting the threshold time, a migration of the VM from the source hypervisor to the target hypervisor via the network is initiated. Based on the estimated time not meeting the threshold time, it is determined whether an additional path can be added to the network between the source hypervisor and the target hypervisor. If an additional path cannot be added to the network, a migration of the VM from the source hypervisor to the target hypervisor via the network is initiated. If an additional path can be added to the network, the additional path is added and the migration via the network is initiated.

20 Claims, 4 Drawing Sheets

(56) References Cited

OTHER PUBLICATIONS

Robert J. Brenneman et al., Pending U.S. Appl. No. 14/945,644 entitled "Performing Virtual Machine Live Migration Within a Threshold Time by Adding Available Network Path in Multipath Network," filed Nov. 19, 2015.

* cited by examiner

US 9,891,943 B2

PERFORMING VIRTUAL MACHINE LIVE MIGRATION WITHIN A THRESHOLD TIME BY ADDING AVAILABLE NETWORK PATH IN MULTIPATH NETWORK

DOMESTIC PRIORITY

This application is a continuation of U.S. patent application Ser. No. 14/945,644, filed Nov. 19, 2015, the content of which is incorporated by reference herein in its entirety.

BACKGROUND

The present disclosure relates to computer systems, and, more specifically, to virtual machine (VM) live migration.

A VM is a software implementation of a machine (i.e., a computer) that executes computer programs. A VM typically emulates a physical computing environment, with requests for central processing unit (CPU), memory, hard disk, network and other hardware resources being managed by a virtualization layer which translates these requests to the underlying physical hardware. VMs are created within a virtualization layer, such as a hypervisor or a virtualization platform that runs on top of a client or server operating system. System migrations of VMs are performed for a variety of reasons, including the ability to provide a back-up system while hardware and/or software upgrades are being installed. System migrations are also performed to move the VM to a new processor or other hardware. There are a variety of methods for performing the migration including halting execution of the VM to perform the migration, and performing a live migration which migrates a VM while it is executing. Live VM migration is often desired by companies with mission critical systems.

VM migration is often bounded by the time that it takes to migrate the state of a VM over a migration network link. The migration network is often a dedicated network, or it may be a prior service/operations dedicated network not used for corporate data.

SUMMARY

According to an embodiment, a method, system, and computer program product for virtual machine (VM) live guest migration are provided. The method includes calculating an estimated time to migrate, via a network, a VM from a source hypervisor to a target hypervisor. The estimated time is compared to a threshold time and based on the estimated time meeting the threshold time, a migration of the VM from the source hypervisor to the target hypervisor via the network is initiated. Based on the estimated time not meeting the threshold time, it is determined whether an additional path can be added to the network between the source hypervisor and the target hypervisor. If an additional path cannot be added to the network, a migration of the VM from the source hypervisor to the target hypervisor via the network is initiated. Based on determining that an additional path can be added to the network: adding the additional path to the network; performing the calculating, comparing, and adding until one or both of the estimated time meets the threshold time, and an additional path cannot be added to the network; and initiating migration of the VM from the source hypervisor to the target hypervisor via the network.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
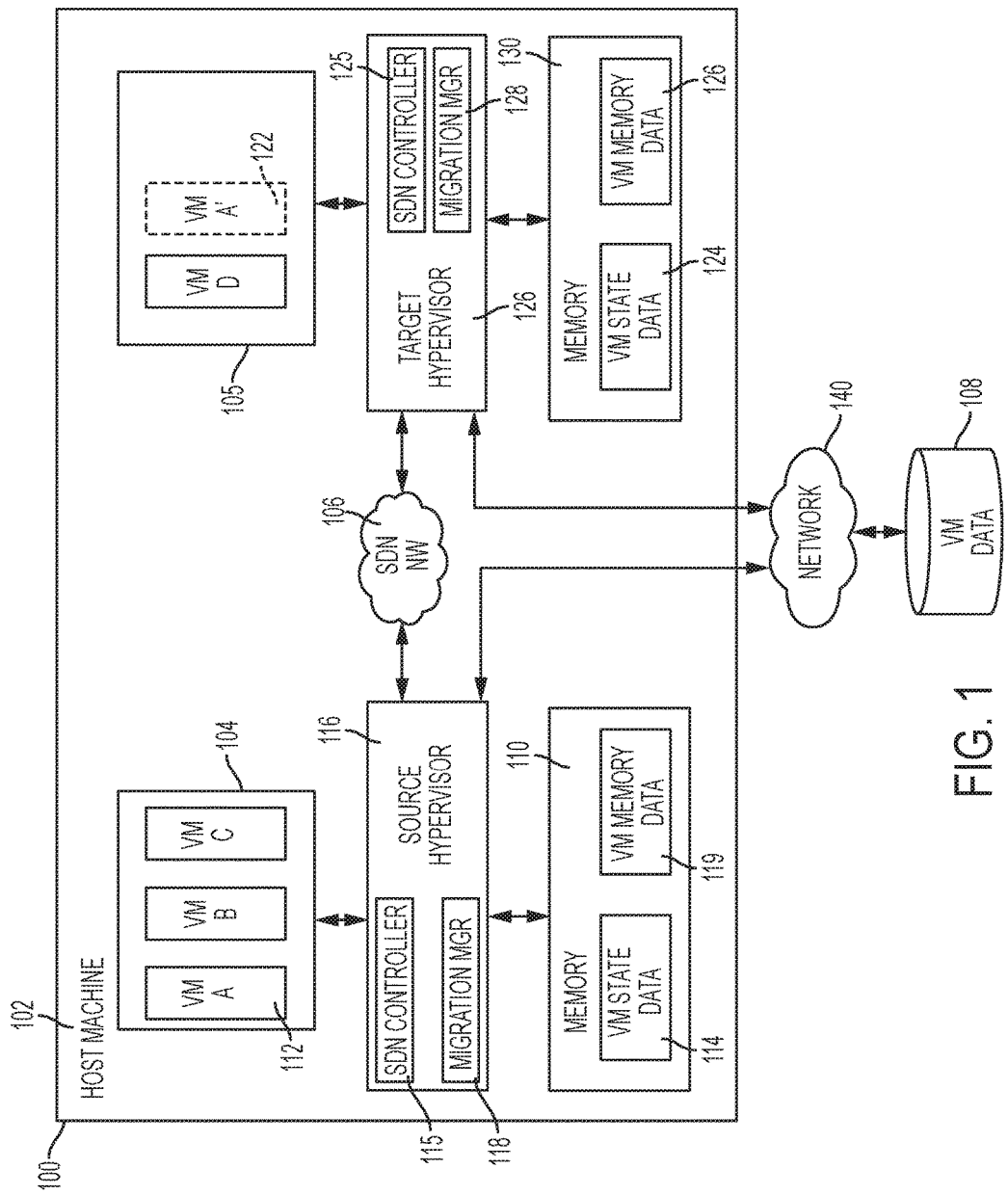
FIG. 1 is a block diagram of a system for performing virtual machine (VM) migration within a single host machine in accordance with an embodiment.

Exemplary embodiments described herein relate to boosting the speed of virtual machine (VM) migrations by using additional central processing unit (CPU) cycles and network paths, when available, to perform the migrations. In embodiments, additional CPU processing cycles can be paired with multiple links, or network paths, to achieve dynamic processing configuration for a VM migration.

When running hypervisors, such as kernel-based VM (KVM) which acts as a host operating system as well as a hypervisor, it is possible to enable functionality like multipath TCP on a host machine to leverage the myriad of physical network interface cards (NICs). Leveraging the NICs can result in achieving substantial throughput increases by effectively aggregating the link bandwidth of each of the private networks for use with VM migration, thus significantly speeding up the migration time of a VM. A limiting factor is the CPU cycles available on the sender and receiver. In accordance with embodiments, during migration time, the processor of the source and target hypervisors of the VM being migrated are throttled up such that the bandwidth between a source and target hypervisor can be maximized.

The increase in CPU time coupled with existing multiple links like intra-ensemble data network (IEDN) and dedicated migration networks, or multiple physical links between hosts supporting hypervisors lend themselves to providing increased network capability and dynamic processing configuration. Modern mainframes often have a plethora of internal networks such as but not limited to: private system control networks (PSCNs), intra-node management networks (INMNs), IEDNs, external data networks (EDNs), and external management networks (EMNs).

In accordance with embodiments, a migration intent is signaled from a source hypervisor to a destination hypervisor. As part of initiating a VM migration, the hypervisors (both the source and target hypervisors) can call to firmware (or a lower level logical partition or "LPAR") to increase the CPU resources until migration is complete. In addition, network links, or paths, between the source and destination hypervisor can be aggregated over a multipath transmission control protocol (TCP). When migration completes, the hypervisors can call to signal to firmware (or a lower level LPAR) that the migration CPU boost is no longer needed.

Multipath TCP transparently supports Internet protocols (IPs) such as IP Version 4 (IPv4) and IP Version 6 (IPv6). A multipath TCP connection can start over IPv4 and then use IPv6 without the application being aware of the utilization of IPv6. This can help the utilization of IPv6 paths by IPv6 unaware TCP applications. In addition, any two hosts (in the same autonomous system, on the same subnet) can utilize embodiments without the need to get a separate autonomous system (AS) number for each host.

In embodiments, if the hardware or network manager on a host is maintaining a list of unused open system adapters (OSAs) physically in the machine, they (the OSAs) can dynamically be added to the hypervisor instances when a migration preparation command is about to be run and then deallocated when the migration completes. A hardware manager on the host can be queried for all available network cards no longer in use, and they can be activated, along with creating or joining existing dedicated (but reserved) virtual local area networks (VLANs) assigned out of the network and connected to the existing OSA for the duration of migration. This can be implemented with a pay as you go model for OSA or the use of a host spare OSA for this purpose to implement a capacity on demand model for OSA cards.

Embodiments can be implemented in any one of, or a combination of environments where there is a spare network card in the machine, execution is in a data center that can provision the network cards dynamically, and/or the machine vendor or provider of the cloud hypervisor uses any kind of network capacity on demand model (where there are perhaps many unused NICs in reserve). Embodiments can utilize hooks (interfaces) for software defined environment (SDE) networking from the hypervisors to define VLANS. In addition, embodiments can utilize existing trunks (connections) to the capacity on demand NICs, and/or multipath TCP if enabled on the hypervisors to provide fast aggregate transport of VMs. Once the migration is complete, embodiments can remove the additional network connections.

In embodiments where symmetric migrations are being performed (i.e., swapping VMs between a source hypervisor and a target hypervisor), and only the source hypervisor and target hypervisor are performing migrations, the traffic flow can be decoupled to provide a dedicated link isolating the traffic flow. This effectively reduces the overhead of multipath TCP when not needed, and this can be done by dropping the link to one of the underlying NICs on the hypervisor while symmetrically doing the same on the other hypervisor.

Multiple VMs can exist simultaneously in a single host machine environment, and the resources of the host machine can be divided among the various VMs. This flexible resource allocation becomes even more useful when combined with the ability to move, or "migrate," VMs from one host machine to another. Being able to migrate a VM quickly and easily from one host machine to another (or between hypervisors on a single host machine) can be useful, for example, for "load balancing" systems, performing hardware or software upgrades, or handling disaster recovery.

Turning now to FIG. 1, a block diagram of a system 100 for performing VM live migration within a single host machine 102 is generally shown in accordance with embodiments. The host machine 102 can be implemented by any processor known in the art such as, but not limited to a personal computer, laptop computer, workstation, minicomputer, or mainframe computer. As shown in FIG. 1, the host machine 102 executes a source hypervisor 116 and a target hypervisor 126. The term "hypervisor" as used herein and as known in the art refers to a low-level application that supports execution of one or more VMs.

The source hypervisor 116 and the target hypervisor 126 manage access to resources of the host system 102 and serve as VM monitors to support concurrent execution of the VMs. Each VM can support specific guest OSs and multiple user sessions for executing software written to target the guest OSs. For example, one VM may support an instance of the Linux RTM OS, while a second VM executes an instance of the z/OS RTM OS. Other guest OSs and additional hypervisors can also be supported by a hypervisor through the VMs. As shown in FIG. 1, prior to migration of VM A 112 to the target hypervisor 126, the source hypervisor 116 executes three VMs 104: VM A 112, VM B, and VM C; and the target hypervisor 126 executes one VM 105: VM D. In the exampled embodiment described herein, after migration is completed, VM A' 122 is executed by the target hypervisor 126 and VM A 112 is no longer being executed by the source hypervisor 116.

In exemplary embodiments, the source hypervisor 116 includes migration manager 118 which executes migration code that packages VM state data 114 and VM memory data 119 corresponding to VM A 112 from memory 110. The VM state data 114 includes information that is utilized to restart VM A 112 (as VM A' 122) on the target hypervisor 126 such as, but not limited to registers, hardware buffers such as network card buffers, input/output (I/O) caches, and/or other transient storage. The migration code can also transmit the packaged data to the target hypervisor 126. The source hypervisor 116 shown in FIG. 1 also includes a software defined network (SDN) controller 115 to support the creation of additional paths (e.g., additional networks) in the SDN network 106 that connects the source hypervisor 116 and the target hypervisor 126.

Similarly, the target hypervisor 126 includes a migration manager 128 that performs various migration operations to receive and activate VM A' 122 based on the data received from the source hypervisor 116. Operations performed by the migration manager 128 can include un-packaging and storing the received VM state data 114 and VM memory data 119 into memory 130 as VM state data 124 and VM memory data 126. The target hypervisor 126 also includes a SDN controller 125 to support the creation of additional paths in the SDN network 106.

The host machine 102 may function as any type of information processing system. In the embodiment shown in FIG. 1, the host machine 102 is a high-speed processing device comprising at least one processing circuit (e.g., a CPU) capable of reading and executing instructions, and handling numerous interaction requests from applications and/or processes within the host machine 102 and/or from user systems as a shared physical resource.

As shown in FIG. 1, embodiments can utilize network attached storage (NAS) to store the VM data 108, on a centralized storage location via a network 140, and thus, in some embodiments there is no need to transfer the VM data 108 as part of a VM migration. The VM data 108 is typically persistent data stored, for example, in a file system. This is contrasted with the transient data such as the VM CPU state (VM state data 114, e.g., registers) and memory contents (VM memory data 119). The VM data 108 can be stored in one storage device as shown in FIG. 1 or across multiple storage devices. As shown in FIG. 1, the VM data 108 is stored in a location that is accessible to both the source hypervisor 116 and the target hypervisor 126 via a network 140.

Figure 2:
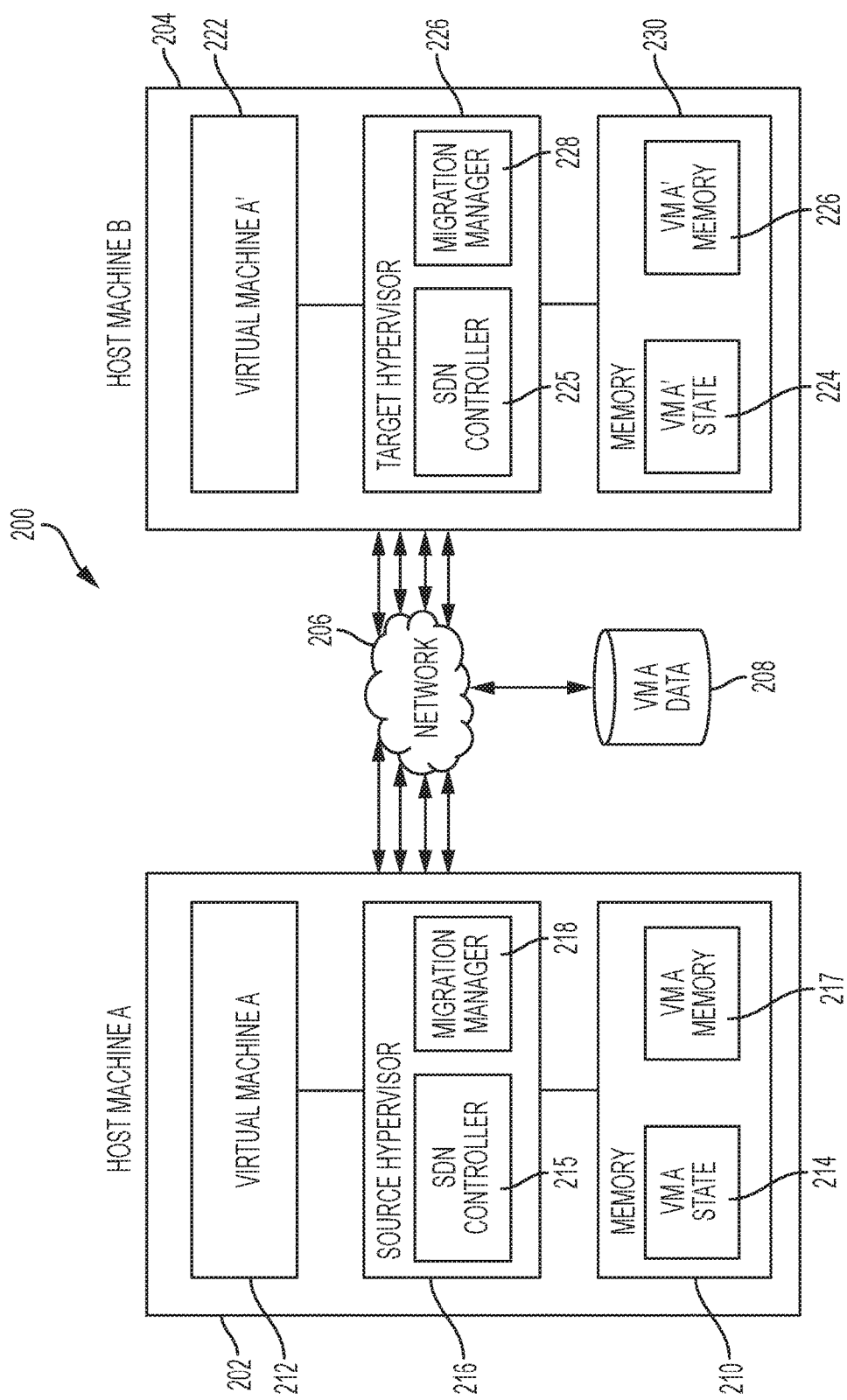
FIG. 2 is a block diagram of a system for performing VM migration across two different host machines in accordance with an embodiment.

Turning now to FIG. 2, a block diagram of a system 200 for performing VM migration across two different host machines is generally shown in accordance with an embodiment. As shown, the operating environment of FIG. 2 includes multiple information processing systems that are communicatively coupled to one or more networks 206 (only two systems are shown for simplicity). Host machine A 202 includes source hypervisor 116 and is communicatively coupled to host machine B 204 which includes target hypervisor 226. The network 206 can be any type of wired and/or wireless communications network. For example, the network 206 may be an intranet, extranet, or an internetwork, such as the Internet, or a combination thereof. The network 206 can include wireless, wired, and/or fiber optic links.

The use of a SDN allows for the definition of additional logical network resources over an existing physical network infrastructure. For example, it may be unnecessary to use SDN in the case where host machine A 202 and host machine B 204 are within the same datacenter, since the network topology within the network 206 is well understood and controlled. However, if host machine A 202 and host machine B 204 are on opposite sides of the United States, the network 206 between them becomes substantially more complex, and in this case it can be beneficial to use SDN to create a simplified logical network connection that spans the distance between host machine A 202 and host machine B 204 to provide the illusion that they are adjacent to each other in the same datacenter. SDN is used in this case to simplify a complex physical network topology into a simple logical network.

In embodiments, the VM A data 208 can be accessed either via the network 206 or by a possibly separate storage access network (SAN) type data network. Larger enterprises will be likely to keep disk data on a separate SAN, while smaller organizations and agile startups will be more likely to run a single large high speed network for all traffic including disk data with technologies such as Internet Small Computer System Interface (iSCSI) and Network File System (NFS)/Common Internet File System (CIFS).

As shown in FIG. 2, host machine A 202 includes a source hypervisor 216 that is hosting VM A 212. Similar to the source hypervisor 116 described above with respect to FIG. 1, source hypervisor 216 includes a SDN controller 215 and a migration manager 218 as well as access to memory 210. The memory 210 stores both state data (VM A state 214) and memory data (VM A memory 217) corresponding to VM A 212. In addition, persistent data related to VM A (VM A data 208) is stored in a storage device that is accessible via the network 206.

As shown in FIG. 2, target machine B includes a target hypervisor 226 that hosts VM A' 222 once the migration of VM A is complete. Similar to the target hypervisor 126 described above with respect to FIG. 1, target hypervisor 226 includes a SDN controller 225 and a migration manager 28 as well as access to memory 230. The memory 230 stores both state data (VM A' state 224) and memory data (VM A' memory 226) corresponding to VM A' 222. In addition, persistent data related to VM A' (VM A data 208) is stored in a storage device that is accessible via the network 206.

Figure 3:
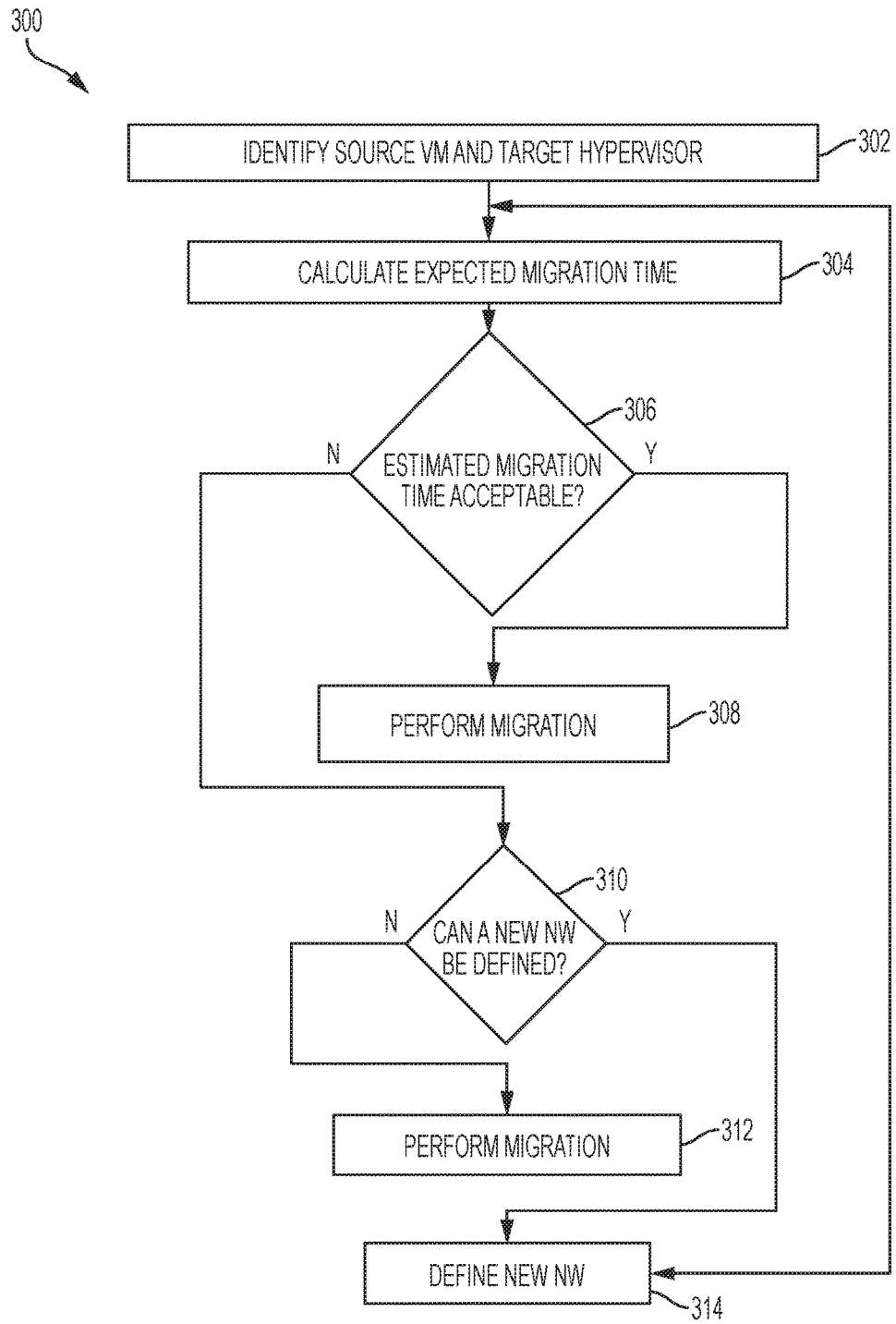
FIG. 3 illustrates a process flow for performing VM migration in accordance with an embodiment.

FIG. 3 illustrates a process flow for performing VM migration in accordance with an embodiment. At block 302, a source VM currently being executed by a source hypervisor is identified along with a target hypervisor for receiving the migrated VM. At block 304, an expected time to migrate the VM from the source hypervisor to the target hypervisor is calculated. In embodiments, the calculating can be based on, but is not limited to: the available bandwidth between the source and target hypervisors, a size of the VM state and memory data, processor speed, and/or processor resources available to the source and target hypervisors for performing the migration.

At block 306, the expected migration time is compared to a threshold time to determine whether the expected migration time is acceptable. The threshold time can be set during an initialization process. In embodiments, the threshold time can be dynamically adjusted based on factors such as, but not limited to: available CPU resources, service level agreements (SLAs), size of VM state and memory data, and current performance metrics of the host machine(s). The threshold time can also vary based on a particular VM being migrated and/or host machine executing the target and/or source hypervisors.

If it is determined, at block 306, that the estimated migration time meets (e.g., is less than) the threshold time, then block 308 is performed to initiate the migration of the VM from the source hypervisor to the target hypervisor. This can include, capturing the current state and memory contents of the VM being migrated using any known manner. For example, U.S. Pat. No. 8,671,256 describes migrating contents of a memory on a VM by performing an iterative process of copying changed memory contents to a source machine until the number of changes is less than a threshold. At this point, the VM is paused or quiesced on the source computer (e.g., source hypervisor), a final iteration of the memory copy process is undertaken including the additional CPU state such as register values, and the VM is started on the target computer (e.g., target hypervisor). At such time as operation is activated on the target computer, the source hypervisor is informed by the target hypervisor, and the VM is removed from the source hypervisor. In embodiments described herein, the activating further includes providing access to the VM data.

Referring back to FIG. 3, if it is determined, at block 306, that the estimated migration time does not meet (e.g., is not less than) the threshold time, then block 310 is performed to determine whether an additional path can be added to the network between the source hypervisor and the target hypervisor. In embodiments, an additional path can be added to the network if an additional path is available (e.g., via SDN) and the target hypervisor has enough processor resources to reassemble packets distributed across the network as part of the VM migration when the additional path is added to the network. The addition of an additional path causes the packaged state and memory data to be distributed across an additional path during migration, and thus requires additional packages to be reassembled when received by the target hypervisor. In embodiments, additional paths are provided by unused network interface cards (NICs) and/or unused open system adapter (OSA) cards.

In embodiments, additional processor resources, if available, can be allocated to the target and/or source hypervisors during the migrating and then, reallocated, or released, when the migration is no longer using the additional resources (e.g., the migration is completed). For example, the CPU allocation to a hypervisor instance that is sending or receiving the VM can be boosted such that packet reordering/reassembly is faster, with the boosting applied for the duration of the migration and the CPU returning to nominal levels when the migration is completed.

In embodiments, an additional path can be added to the network if an additional path is available and an estimated elapsed time to add the additional path to the network is within a second threshold time. In embodiments the second threshold time is set during an initialization process. In embodiments, the second threshold time can be dynamically adjusted based on factors such as, but not limited to: available CPU resources, service level agreements (SLAs), size of VM state and memory data, and current performance metrics of the host machine(s). The second threshold time can also vary based on a particular VM being migrated and/or host machine executing the target and/or source hypervisors.

If it is determined, at block 310, that an additional path cannot be added to the network between the source hypervisor and the target hypervisor, then block 312 is performed with the current network and the target hypervisor initiates the migration of the VM.

If it is determined, at block 310, that an additional path can be added to the network, block 314 is performed to add the additional path. In an embodiment, adding the additional path may include adding a new SDN network between the source hypervisor and the target hypervisor if required. Adding the additional path can also include, but is not limited to: altering firewall rules to permit relocation; updating quality of service configuration on the network links in the datacenter or on the SDN definition in order to guarantee relocation bandwidth; and/or updating cryptographic and compression attributes on the network links or SDN definition to protect the data in transit and make the most efficient use of the available bandwidth. Processing then continues at block 304. In embodiments, blocks 304-314 are performed until it is determined at block 306 that the estimated migration time is acceptable or until it is determined at block 310 that a new network cannot be defined between the source and target hypervisors.

Figure 4:
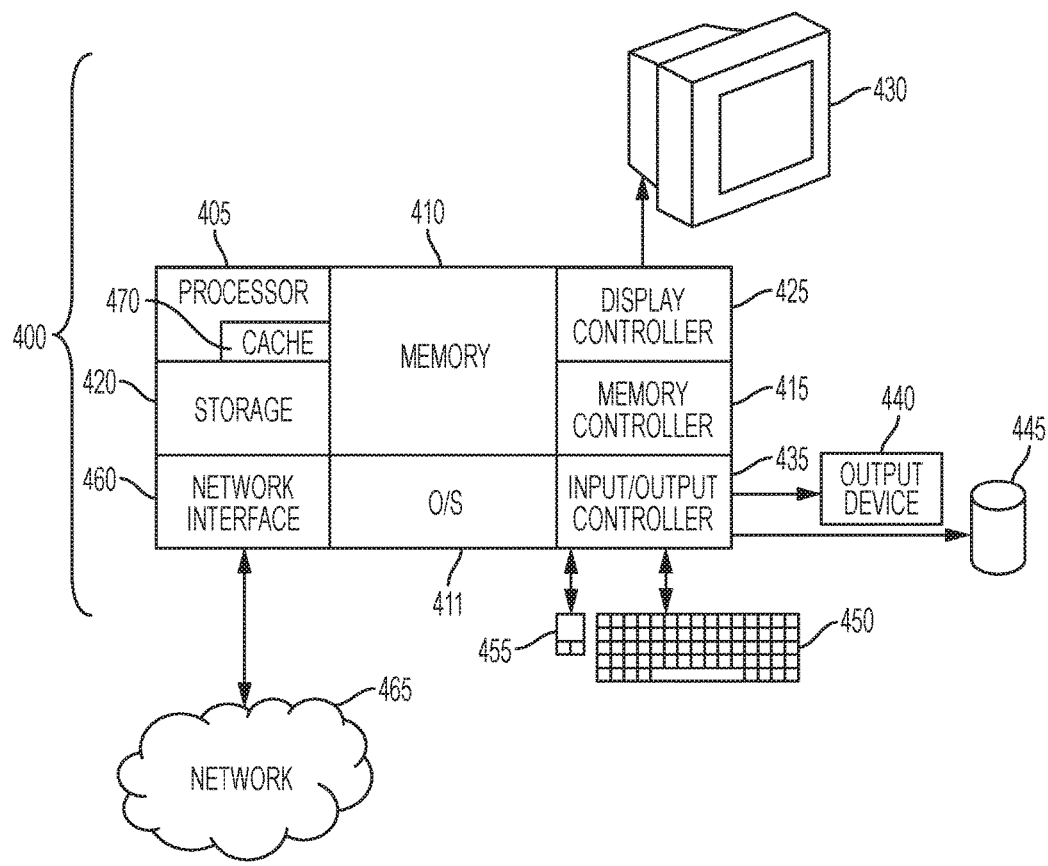
FIG. 4 is a block diagram of a computer system for performing VM migration in accordance with an embodiment.

Turning now to FIG. 4, a block diagram of a computer system 400 for VM migration is generally shown in accordance with an embodiment. Systems and methods for VM migration may be implemented in hardware, software (e.g., firmware), or a combination thereof. In some embodiments, the methods described herein may be implemented, at least in part, in hardware and may be part of the microprocessor of a special or general-purpose computer system 400, such as a mobile device, personal computer, workstation, minicomputer, or mainframe computer.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The OS 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the systems and methods for performing a VM migration in accordance with embodiments described herein.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. Embodiments can also provide remote direct memory access (RDMA) or RDMA over other mediums such as, but not limited to TCP/IP. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for performing VM live migration according to this disclosure may be embodied, in whole or in part, in computer program products or in computer systems 400, such as that illustrated in FIG. 4.

Technical effects and benefits include the ability to reduce the elapsed time to migrate a VM by dynamically assigning additional network and/or processor resources to the migration.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method of virtual machine (VM) live migration, the method comprising:
    calculating an estimated time to migrate a VM from a source hypervisor to a target hypervisor, the source hypervisor and the target hypervisor in communication via a network;
    comparing the estimated time to a first threshold time;
    based on the estimated time meeting the first threshold time:
        initiating migration of the VM from the source hypervisor to the target hypervisor via the network; and
    based on the estimated time not meeting the first threshold time:
        determining whether an additional path can be added to the network between the source hypervisor and the target hypervisor, wherein the additional path can be added to the network in response to a determination that an estimated elapsed time to add the additional path to the network is within a second threshold time;
        based on determining that an additional path cannot be added to the network, initiating migration of the VM from the source hypervisor to the target hypervisor via the network; and
        based on determining that an additional path can be added to the network:
            adding the additional path to the network between the source hypervisor and the target hypervisor;
            performing the calculating, comparing, and adding until one or both of the estimated time meets the first threshold time, and an additional path cannot be added to the network; and
            initiating migration of the VM from the source hypervisor to the target hypervisor via the network.

2. The method of claim 1, wherein it is determined that an additional path can be added to the network further in response to a determination that the target hypervisor has processor resources to reassemble packets distributed across the network as part of the VM migration when the additional path is added to the network.

3. The method of claim 1, wherein the network includes a software defined network (SDN).

4. The method of claim 1, wherein the additional path includes a new SDN.

5. The method of claim 1, wherein the source hypervisor and the target hypervisor are located on different host machines.

6. The method of claim 1, wherein the source hypervisor and the target hypervisor are located on a single host machine.

7. The method of claim 1, wherein the VM includes a VM state, VM memory contents, and VM data, and the migrating includes transmitting, via the network, the VM state and the VM memory contents from the source hypervisor to the target hypervisor.

8. The method of claim 7, wherein the VM data is stored on a storage device accessible to both the source hypervisor and the target hypervisor and the migrating further includes providing the target hypervisor access information about the VM data on the storage device.

9. A system for virtual machine (VM) live migration, the system comprising:
    a memory having computer readable instructions; and
    a processor for executing the computer readable instructions, the computer readable instructions when executing perform:
        calculating an estimated time to migrate a VM from a source hypervisor to a target hypervisor, the source hypervisor and the target hypervisor in communication via a network;
        comparing the estimated time to a threshold time;
        based on the estimated time meeting the threshold time:
            initiating migration of the VM from the source hypervisor to the target hypervisor via the network; and
        based on the estimated time not meeting the threshold time:
            determining whether an additional path can be added to the network between the source hypervisor and the target hypervisor, wherein the additional path can be added to the network in response to a determination that an estimated elapsed time to add the additional path to the network is within a second threshold time;
            based on determining that an additional path cannot be added to the network, initiating migration of the VM from the source hypervisor to the target hypervisor via the network; and
            based on determining that an additional path can be added to the network:
                adding the additional path to the network between the source hypervisor and the target hypervisor;
                performing the calculating, comparing, and adding until one or both of the estimated time meets the threshold time, and an additional path cannot be added to the network; and initiating migration of the VM from the source hypervisor to the target hypervisor via the network.

10. The system of claim 9, wherein it is determined that an additional path can be added to the network further in response to a determination that the target hypervisor has processor resources to reassemble packets distributed across the network as part of the VM migration when the additional path is added to the network.

11. The system of claim 9, wherein the network includes a software defined network (SDN).

12. The system of claim 9, wherein the additional path includes a new SDN.

13. The system of claim 9, wherein the source hypervisor and the target hypervisor are located on different host machines.

14. The system of claim 9, wherein the source hypervisor and the target hypervisor are located on a single host machine.

15. The system of claim 9, wherein the VM includes a VM state, VM memory contents, and VM data, and the migrating includes transmitting, via the network, the VM state and the VM memory contents from the source hypervisor to the target hypervisor.

16. The system of claim 15, wherein the VM data is stored on a storage device accessible to both the source hypervisor and the target hypervisor and the migrating further includes providing the target hypervisor access information about the VM data on the storage device.

17. A computer program product for virtual machine (VM) live migration, the computer program product comprising a computer readable storage medium having program code stored therein, the program code executable by a processor for:

calculating an estimated time to migrate a VM from a source hypervisor to a target hypervisor, the source hypervisor and the target hypervisor in communication via a network;

comparing the estimated time to a threshold time;

based on the estimated time meeting the threshold time:
    initiating migration of the VM from the source hypervisor to the target hypervisor via the network; and based on the estimated time not meeting the threshold time:
    determining whether an additional path can be added to the network between the source hypervisor and the target hypervisor, wherein the additional path can be added to the network in response to a determination that an estimated elapsed time to add the additional path to the network is within a second threshold time;

based on determining that an additional path cannot be added to the network, initiating migration of the VM from the source hypervisor to the target hypervisor via the network; and based on determining that an additional path can be added to the network:
        adding the additional path to the network between the source hypervisor and the target hypervisor;
        performing the calculating, comparing, and adding until one or both of the estimated time meets the threshold time, and an additional path cannot be added to the network; and
        initiating migration of the VM from the source hypervisor to the target hypervisor via the network.

18. The computer program product of claim 17, wherein it is determined that an additional path can be added to the network further in response to a determination that the target hypervisor has processor resources to reassemble packets distributed across the network as part of the VM migration when the additional path is added to the network.

19. The computer program product of claim 17, wherein the network includes a software defined network (SDN).

20. The computer program product of claim 17, wherein the additional path includes a new SDN.

* * * * *